United States Patent [19]
Maake

[11] 3,798,419
[45] Mar. 19, 1974

[54] ELECTRICAL SURFACE HEATING ASSEMBLY

[75] Inventor: Douglas Herman Maake, Cookeville, Tenn.

[73] Assignee: Gould, Inc., Chicago, Ill.

[22] Filed: Mar. 12, 1973

[21] Appl. No.: 340,094

[52] U.S. Cl.............. 219/541, 174/117 A, 219/219, 219/345, 219/544, 219/549, 338/212, 338/314
[51] Int. Cl........ H05b 3/20, H01c 3/00, H01b 7/08
[58] Field of Search........... 219/345, 342, 526, 528, 219/536, 541, 542, 544, 548, 549, 529; 338/210–214, 206, 208, 312, 313, 314, 273–276, 255, 256; 174/117 A; 339/220 R, 220 C

[56] References Cited
UNITED STATES PATENTS

| 2,938,992 | 5/1960 | Crump | 338/208 X |
| 2,971,073 | 2/1961 | Eisler | 219/345 X |
| 3,397,302 | 8/1968 | Hosford | 219/544 X |
| 2,600,485 | 6/1952 | Cox | 338/255 X |
| 2,682,596 | 6/1954 | Cox et al. | 338/314 X |
| 3,096,428 | 7/1963 | Dublirer et al. | 219/529 |
| 3,697,728 | 10/1972 | Stirzenbecher | 219/528 X |
| 2,503,457 | 4/1950 | Speir et al. | 219/549 X |
| 3,372,487 | 3/1968 | Eisler | 219/542 X |
| 3,473,003 | 10/1969 | Eisler | 219/345 X |

FOREIGN PATENTS OR APPLICATIONS
563,359  9/1958  Canada.......................... 174/117 A Primary Examiner—A. Bartis
Attorney, Agent, or Firm—Edward E. Sachs

[57] ABSTRACT

An electric conduction heating assembly for heating a base member comprises a thin strip of apertured, foil-like resistance material encapsulated between two thin sheets of electrical insulation material. The resistance strip is provided with a terminal assembly at each of its ends. Each terminal assembly includes a terminal connector having an apertured base. Prongs having an axial extent corresponding to the thickness of one of the insulation layers extends through the resistance strip, the insulation layer and the aperture in the terminal to clamp the resistance material against the prongs, whereby the prongs limit the plastic flow of the insulation layer during the riveting operation. The other layer of insulation material is provided with a pressure-sensitive adhesive coating covered by a removable protective release laminate so that the assembly may be secured to a surface to be heated. The assembly has particular utility as a heater for automotive mirrors to prevent ice accumulation on the reflecting surface thereof.

15 Claims, 3 Drawing Figures

PATENTED MAR 19 1974   3,798,419
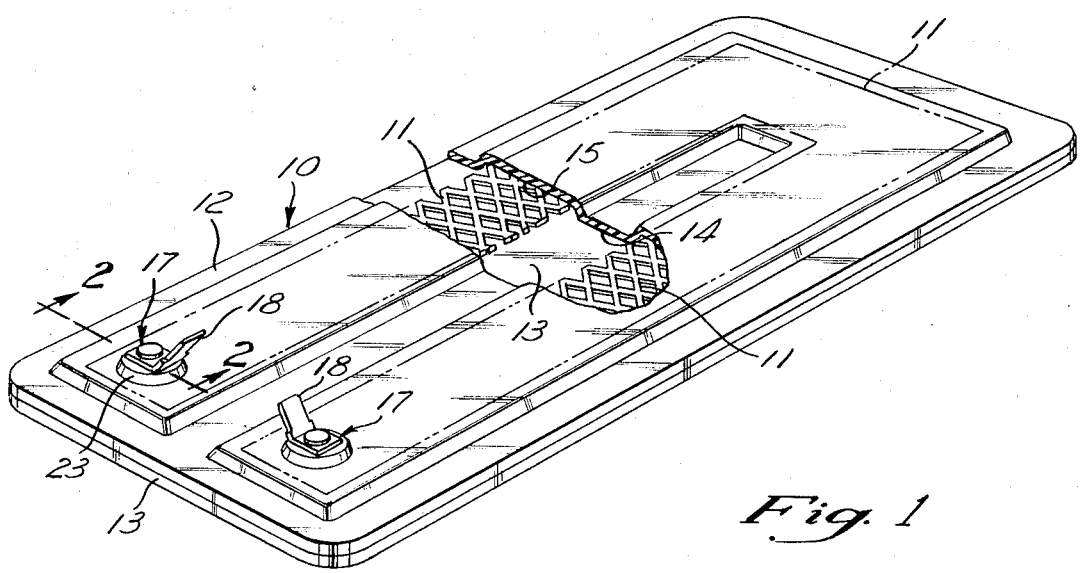
Fig. 1
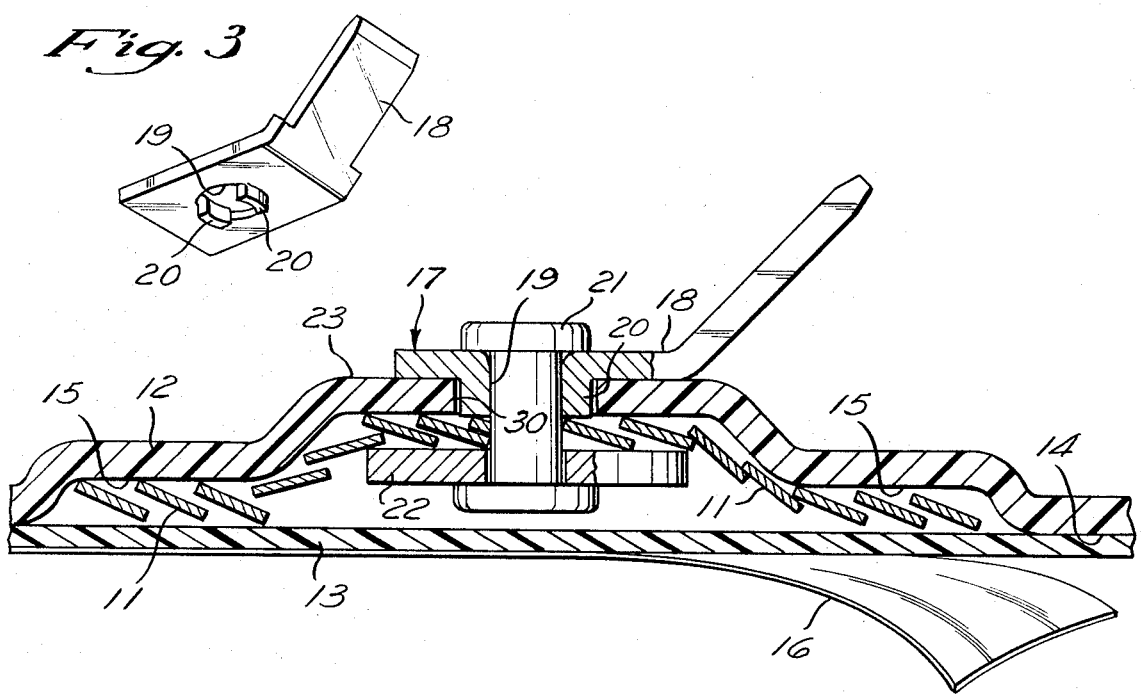
Fig. 3
Fig. 2

ELECTRICAL SURFACE HEATING ASSEMBLY

BACKGROUND OF THE INVENTION

This invention relates generally to conduction heating assemblies and, more particularly, to conduction assemblies which may be applied to external side view mirrors of automotive vehicles. Side view mirrors have a tendency to become encrusted with ice during freezing rains or during slushy road conditions where the relatively cold mirror will tend to freeze liquid deposited thereon. Therefore, the driver of the automobile or truck may periodically stop his vehicle to chip the ice away from the mirror surface. Of course, this is a dangerous procedure, since it necessarily takes place during hazardous driving conditions and, therefore, motorists and truckers will merely attempt to clear the mirror on the driver's side while driving and ignore the mirror on the passenger's side. In attempting to clear ice from the mirror, however, the mirror surface may be scratched, or even broken, by the scraping operation.

Consequently, a need has arisen for devices which will heat external mirrors to remove condensate and ice from mirror surfaces or to prevent the formation of condensate and ice on the surface. Prior art attempts to accomplish these objectives include two general types of heaters. A first type involves heating the air space between the glass mirror and its cup-shaped back mounting case. The air space is heated by light bulbs or heating coils mounted between the mirror and the case. The air volume of the space is thereby heated to thereby heat the mirror itself by conduction. A second mirror heater includes those heaters which are designed to heat the back surface of the mirror and to thereby heat the mirror itself by conduction. Those heaters comprise a carbon-deposited film on an asbestos backing. The carbon coated surface is applied and adhered to the back surface of the mirror between the mirror and its mounting case and suitable electrical terminals are provided to heat the laminate.

These arrangements have not been widely accepted. Those units which are designed to heat a compartment enclosing a portion of the mirror are relatively slow, since they are designed to heat by convection and radiation.

Those units which are designed to heat the mirror from the back side by conduction are much more efficient. However, heaters which comprise carbon-deposited film on an asbestos backing tend to deteriorate under high temperature conditions, and some designs are not waterproof and fail when exposed to moisture.

SUMMARY OF THE INVENTION

This invention overcomes these prior art problems by providing an inexpensive yet durable mirror heater which is designed to be applied to the back side of a mirror to heat the mirror surface by conduction. According to a preferred embodiment of this invention, the heater comprises a thin strip of apertured, foil-like, electric resistance material which is received within a pocket formed in a sheet of electrical insulating material. A second sheet of electrical insulating material covers the first sheet and is sealed thereto to encapsulate the heating element in a waterproof pocket. The exposed face of the second sheet is provided with a pressure-sensitive adhesive coating so that the heating element assembly may be applied to the rear surface of a mirror to be encapsulated by the mirror mount. In situations where the surface to which the assembly is to be attached is non-conductive, the second sheet may be eliminated and the first sheet may be adhered directly to that surface. Terminal connections extend through the first sheet and are electrically connected to the heating element so that the element may be energized by an A.C. or D.C. power source. The assembly according to this invention is easy to install, is waterproof, and adds structural strength to the mirror or any other article to which it is attached.

BRIEF DESCRIPTION OF THE DRAWING

FIG. 1 is a perspective view of a heating element assembly according to this invention, with portions thereof broken away to show details of construction;

FIG. 2 is a cross sectional view, the plane of the section being indicated by the line 2—2 in FIG. 1; and FIG. 3 is a perspective view of a terminal connector employed in this invention.

DETAILED DESCRIPTION OF THE INVENTION

Referring now to the drawing, a conduction heating assembly 10 is illustrated. The assembly 10 is adapted to be fixed to the rear surface of a side view mirror and includes a foil-like strip 11 of commercially available material which has electric resistance characteristics. The strip 11 has a diamond-shape expanded metal configuration and is the type set forth in detail in U.S. Pat. No. 3,651,304, the disclosure of which is incorporated herein by reference.

The strip 11 is U-shaped, but it should be appreciated that other strip patterns may be employed in accordance with the teachings of this invention. Encapsulating the strip 11 is a first sheet 12 of plastic material and a second sheet 13 of plastic material. The sheet 12 is preferably molded from a polycarbonate resin, since such resins have high impact strength, excellent creep resistance over broad temperature ranges, wide temperature limits (high impact resistance at —60° F. and excellent deflection resistance at 279° F.), high insulation resistance, and independence of dielectric constant on temperature. The polycarbonate resin sheet has a planar face 14, and a U-shaped pocket 15 is formed therein to receive the strip 11. The sheet 12 may also be molded from filled (fiber reinforced with glass or asbestos) or unfilled versions of thermoplastic polymers such as polyethylene terephthalate, nylon 6, nylon 66, nylon 610, or nylon 612.

Completely enclosing the strip 11 within the pocket 15 is the sheet 13, which is preferably formed from a vinyl resin. The sheet 13 is coated on both sides with a pressure-sensitive adhesive, and adheres to the surface 14. The exposed face of the sheet 13 has its pressure-sensitive coating protectively covered by a release liner 16 (FIG. 2). Of course, the sheet 13 may be adhered to the face 14 by means other than adhesive. For example, the sheet 13 may be adhered by a heat sealing technique or any other technique which will provide a waterproof joint between the sheets 12 and 13 to protect the strip 11 against atmospheric corrosion. The encapsulation of the strip 11 is such that the strip 11 is snugly sandwiched between the sheets 12 and 13 so that there is substantial contact between the strip 11 and the sheet 13, and so that heat may be transferred through the sheet 13 by conduction.

Terminal assemblies 17 are provided at each end of the strip 11 for connection to a power source. The assemblies 17 comprise a male terminal connector blade 18 having an aperture 19 in its base. The aperture 19 has downwardly projecting prongs 20 which extend into an aperture 30 in the sheet 12. The axial extent of the prongs 20 substantially corresponds to the thickness of the sheet 12. Each terminal 18 is electrically connected to an end of the strip 11 by a rivet 21 which extends through the aperture 19 to securely clamp the strip 11 between the projections 20 and a washer 22, and to form a tight, waterproof seal between the terminal connector blade 18 and the sheet 12. The projections 20 ensure that the sheet 12 will not be subjected to any substantial plastic flow as a result of the riveting operation. Any such plastic flow may spread the aperture 30 in the sheet 12 to an extent that moisture may seep into the pocket 15.

To accommodate the terminal assembly 17, the sheet 12 is provided with a raised portion 23 so that the strip 11 and the terminal assembly do not extend beyond the face 14.

In certain applications where the surface to which the heating assembly is applied is non-conductive, the sheet 13 may be eliminated and the face 14 may be applied directly to the surface with a suitable bonding agent.

While there have been described what are at present considered to be the preferred embodiments and aspects of this invention, it will be obvious to those skilled in the art that various changes and modifications may be made therein without departing from the invention, and it is intended therefore in the appended claims to cover all such changes and modifications as fall within the true spirit and scope of the invention.

What is claimed is:

1. A conduction heating assembly for heating a base member, comprising:
    a thin strip of apertured foil-like electric resistance material having a first apertured surface substantially conforming to the topography of said base member;
    a layer of electrical insulating material having portions of one surface covering a second apertured surface of said electric resistance material;
    means to secure said insulating material to said base member and to position said resistance material in heat conducting relationship with respect to said base member; and
    terminal assemblies secured to each end of said electric resistance material, each terminal assembly comprising a terminal connector having an aperture in its base, prong means extending from the periphery of said aperture and through an aperture in said layer, the axial extent of said prong means substantially corresponding to the thickness of said layer, rivet means extending through the aperture in said terminal, through said layer, and through aperture means in said electric resistance material and clamping said strip against said prong means, whereby said prong means limit the plastic flow of said layer during a riveting operation.

2. A conduction heating assembly according to claim 1, wherein said securing means includes a sheet of electrical insulating material having a first surface covering and in contact with said first surface of said resistance material and being in heat conducting relationship therewith.

3. A conduction heating assembly according to claim 2, wherein portions of said first surface of said sheet are bonded to other portions of said one surface of said layer.

4. A conduction heating assembly according to claim 3, wherein a second surface of said sheet is coated with adhesive means.

5. A conduction heating assembly according to claim 4, wherein said adhesive means is a pressure-sensitive adhesive.

6. A conduction heating assembly for heating a base member, comprising:
    a thin strip of apertured foil-like electric resistance material having a first apertured surface substantially conforming to the topography of said base member;
    a layer of heat and electrical insulating material covering a second apertured surface of said electric resistance material and having a laterally projecting flange extending from said resistance material;
    means to secure said flange to said base member and to position said resistance material in heat conducting relationship with respect to said base member; and
    terminal assemblies secured to each end of said electric resistance material, each terminal assembly comprising a terminal connector having an aperture in its base, prong means extending from the periphery of said aperture and through an aperture in said layer, the axial extent of said prong means substantially corresponding to the thickness of said layer, rivet means extending through the aperture in said terminal, through said layer, and through aperture means in said electric resistance material and clamping said strip against said prong means, whereby said prong means limit the plastic flow of said layer during a riveting operation.

7. A conduction heating assembly according to claim 2, wherein said securing means includes a sheet of electrical insulating material having a first surface covering and in contact with said first surface of said resistance material and being in heat conducting relationship therewith.

8. A conduction heating assembly according to claim 7, wherein portions of said first surface of said sheet are bonded to said projecting flange.

9. A conduction heating assembly according to claim 8, wherein a second surface of said sheet is coated with adhesive means.

10. A conduction heating assembly according to claim 9, wherein said adhesive means is a pressure-sensitive adhesive.

11. A conduction heating assembly for heating a base member, comprising:
    a layer of insulating material;
    pocket means defined by portions of one surface of said layer;
    a thin strip of apertured foil-like electric resistance material received in said pocket;
    means to secure remaining portions of said one surface of said layer to said base member and to position said resistance material in heat conducting relationship with respect to said base member; and terminal assemblies secured to each end of said electric resistance material, each terminal assembly comprising a terminal connector having an aperture in its base, prong means extending from the periphery of said aperture and through an aperture in said layer, the axial extent of said prong means substantially corresponding to the thickness of said layer, rivet means extending through the aperture in said terminal, through said layer, and through aperture means in said electric resistance material and clamping said strip against said prong means, whereby said prong means limit the plastic flow of said layer during a riveting operation.

12. A conduction heating assembly according to claim 3, wherein said securing means includes a sheet of electrical insulating material having a first surface covering and in contact with said resistance material and being in heat conducting relationship therewith.

13. A conduction heating assembly according to claim 12, wherein portions of said first surface of said sheet are bonded to said remaining portions.

14. A conduction heating assembly according to claim 13, wherein a second surface of said sheet is coated with adhesive means.

15. A conduction heating assembly according to claim 14, wherein said adhesive means is a pressure-sensitive adhesive.

* * * * *